Patented May 6, 1952

2,595,581

UNITED STATES PATENT OFFICE 2,595,581

THERMAL POLYMERIZATION OF ALPHA METHYL STYRENES

Hugh Campbell Highet and Francis Edward Salt, Banstead, and Herbert Muggleton Stanley, Tadworth, England, assignors to The Distillers Company Limited, Edinburgh, Scotland, a British company No Drawing. Application January 24, 1949, Serial No. 72,544. In Great Britain February 7, 1948

12 Claims. (Cl. 260—669)

The present invention relates to the thermal polymerisation of alpha-methyl styrene and its lower nuclear homologues, and has as one object the production of polymerised alpha-methyl styrene compounds in a comparatively simple plant which need not be corrosion resistant. A further object is the production of polymerised alpha-methyl styrene compounds which are free from inorganic materials and have good physical and electrical properties by a process which obviates the need for washing or filtration to remove catalyst.

It is known that alpha-methyl styrene may be polymerised with the aid of catalysts such as sulphuric acid, stannic chloride or acid-activated clay, and it is known that the polymerisation may be effected in the absence of catalysts at about 100° C. under pressures of the order of 5,000 atmospheres, but it has hitherto been supposed that heating in the absence of catalysts under moderate pressures, for example, less than about 40 atmospheres, at temperatures up to about 200° C. will not result in an appreciable degree of polymerisation, while heating for a prolonged period at 250° C. results in carbonisation accompanied by only a small conversion to the unsaturated dimer.

It has now been found that alpha-methyl styrene and/or its lower nuclear homologues may be polymerised without the formation of a carbonaceous deposit at temperatures in the range 290–350° C. in admixture with at least 10% by weight (on the mixture) of an inert diluent, in the absence of a catalyst and under a pressure sufficient to maintain the liquid phase.

Any inert diluent may be employed, but it is convenient to use the aromatic hydrocarbon from which the alpha-methyl styrene compound is derived, when the process of this invention may advantageously be combined with the production of the monomer. Thus, in the dehydrogenation of, for example, isopropyl benzene or cymene, the immediate product is a solution of the monomer of about 20–40% concentration, and this can be treated directly or after removal of some of the solvent, as desired.

Alpha-methyl styrenes from other sources may, of course be employed, and one mixture which may be subjected to the thermal treatment of this invention is the distillate from a naphtha in which the styrenes having no substituent in the vinyl side chain have been selectively polymerised.

The concentration of monomer in the starting material is preferably at least 30%, since with greater amounts of diluent the conversion is comparatively slow.

The novel process may, if desired, be carried out batchwise in an autoclave or sealed tube but, as no catalyst is required, it is particularly well adapted to continuous operation and the preferred method is to pass the monomer and diluent through an elongated tube which may be coiled and surrounded by a controlled heating means such as an oil bath.

The use of batch and continuous methods in the novel polymerisation process is illustrated by the following examples.

EXAMPLES 1 TO 4

In each of four experiments a charge of 30 grams of a mixture of alpha-methyl styrene and isopropyl benzene was inserted in an open ended glass tube partly immersed in a bath consisting of isopropyl benzene or a mixture similar to the charge. This was placed in an autoclave which was then sealed and immersed in an oil bath, and the oil bath was then heated to a temperature in the range 300 to 320° C. About 3 hours was required for the temperature to reach 280° C. and the duration of the reaction was measured from this point to the time when the autoclave was removed from the oil bath and allowed to cool in air. The following two tables show the reaction conditions and the products obtained.

*Table 1.—Reaction conditions*

| Example No. | Duration (hours) | Temp., °C. | Pressure lb./sq." | Charge Per Cent w./w. monomer | Bath |
|---|---|---|---|---|---|
| 1 | 2 | 288–312 | 200–240 | 88 | isopropyl benzene. |
| 2 | 2¼ | 288–303 | 200–240 | 48.5 | reaction mixture. |
| 3 | 3 | 288–303 | 175–195 | 66 | Do. |
| 4 | 2 | 288–307 | 150–175 | 66 | Do. |

*Table 2.—Reaction products*

| Example No. | Per cent w./w. polymer content | Per cent conversion | $n_D^{20}$ |
|---|---|---|---|
| 1 | 55.3 | 62.9 | 1.5707 |
| 2 | 20.6 | 42 | 1.5695 |
| 3 | 41.2 | 62.5 | |
| 4 | 38.8 | 58.7 | 1.5709 |

The percent conversion figures given in Table 2 were found from the amount of polymer remaining after the unchanged alpha-methyl styrene and isopropyl benzene had been removed by distillation at liquid temperature of up to 180° C. under a pressure of 10 mm. of mercury.

EXAMPLES 5 TO 12

A mixture of alpha-methyl styrene and isopropyl benzene was pumped upwards through a 30' x ¼" internal diameter mild steel coil consisting of 16 turns of 7" diameter surrounded by a heated oil bath. The product from the coil then passed to a short coil cooled by running water, and thence to a spring-loaded relief valve which released the product at atmospheric pressures while maintaining the pressure in the coil at 250–350 lbs./sq. in.

The reaction product was distilled to remove unchanged alpha-methyl styrene and isopropyl benzene, using final liquid temperature of 180° C. under 10 mm. mercury pressure, and the yield of polymer was calculated from the weight of residue obtained. It will be appreciated that, in commercial operations, the distillate is available for recycling.

The following tables show the effect of varying conditions on the extent of conversion and degree of polymerisation.

In Table 4 the unsaturation is given as the equivalent of alpha-methyl styrene, and the molecular weight was determined by the standard freezing point depression method using benzene as the solvent.

Table 3.—Reaction conditions and yields

| Example No. | Oil Temp., °C. | Feed | | Products | | Loss, per cent |
|---|---|---|---|---|---|---|
| | | Per cent w./w. methyl styrene | Rate cc./hr. | Polymer Content, per cent w./w. | Polymer Yield, per cent w./w. | |
| 5 | 300 | 48 | 196 | 11.5 | 26.0 | 3.9 |
| 6 | 300 | 48 | 82 | 22.3 | 46.5 | 0.6 |
| 7 | 300 | 83.7 | 100 | 41.4 | 49.4 | 4.5 |
| 8 | 300 | 83.7 | 63.4 | 54.3 | 64.9 | 2.0 |
| 9 | 300 | 88 | 130 | 48.0 | 54.5 | 1.8 |
| 10 | 300 | 88 | 83 | 60.7 | 69.0 | 1.1 |
| 11 | 325 | 83.7 | 115 | 66.5 | 79.4 | 3.8 |
| 12 | 332 | 88.0 | 72.5 | 72.5 | 82.6 | 11.3 |

Table 4.—Properties of polymer

| Example | Colour | Per cent unsaturation | $n_D^{20}$ | Viscosity Centistokes, 20° C. | Molecular weight |
|---|---|---|---|---|---|
| 5 | Yellow | 31.5 | 1.5683 | 23.0 | |
| 6 | Brown | 28.7 | 1.5697 | 29.5 | |
| 7 | Light Brown | 34.6 | 1.5700 | 32.9 | 268 |
| 8 | do | 29.2 | 1.5718 | 49.0 | 271 |
| 9 | do | 32.2 | 1.5704 | 34.1 | |
| 10 | Brown | 24.6 | 1.5727 | 53.9 | |
| 11 | Dark Brown | 18.0 | 1.5838 | 186.2 | 275 |
| 12 | do | 17.6 | 1.5850 | 210.7 | 278 |

The molecular weight determinations showed that the polymer obtained was a mixture of dimer and trimer, with a preponderance of dimer, and the addition of 10 vols. of methanol to give a clear mixture indicated the absence of even small amounts of high molecular weight polymers. Accordingly, a large part of the polymer was distillable, and distillation under 8 to 10 mm. mercury starting at about 180° C. gave a colourless main fraction amounting to about 70% of the material distilled, having electrical properties superior to those of the original polymer.

The following table shows the electrical characteristics at 20° C. of polymers produced by the present process, compared with those of a polymer, sample A, produced by polymerisation in the presence of clay. Sample B is the product of Example 7, C is a bulked polymer from several runs similar to examples 6 to 13, having 28.3% unsaturation (as alpha-methyl styrene), $n_D^{20}$ 1.5714 and viscosity 40 centistokes at 20° C. and D is a distillate for sample C collected as the main fraction at 170 to 192° C. under 9 to 10 mm. mercury pressure having 33.2% unsaturation, $n_D^{20}$ 1.5668 and viscosity 16.6 centistokes at 20° C.

Table 5.—Electrical properties

| Sample | Volume Resistivity ohms/ccm. | Power Factor | | Permittivity | |
|---|---|---|---|---|---|
| | | 800 cycles | 1,600 cycles | 800 cycles | 1,600 cycles |
| A | $2.7 \times 10^{11}$ | 0.0055 | 0.0061 | 2.64 | 2.65 |
| B | $7.7 \times 10^{11}$ | 0.0037 | 0.0045 | 2.58 | 2.58 |
| C | $2.9 \times 10^{12}$ | less than 0.004 | less than 0.004 | 2.58 | 2.58 |
| D | greater than $2 \times 10^{13}$ | less than 0.002 | less than 0.004 | 2.58 | 2.57 |

Thus, it will be seen that polymers produced by the present process compare favourably with those produced by the clay process, and the distillate is even superior in this respect.

While the present invention has been described mainly with respect to alpha-methyl styrene, it will be appreciated that the lower nuclear homologues, such as alpha-methyl para-methyl styrene and the dimethyl and ethyl derivatives and their mixtures may be treated in the same way to give the respective polymers.

We claim:

1. A process which comprises polymerising an alpha-methyl styrene compound selected from the group consisting of alpha-methyl styrene and its lower nuclear homologues by heating a solution thereof in an inert diluent, of a concentration not exceeding 90% by weight, in the absence of a polymerisation catalyst, in the liquid phase, at a temperature in the range 290–350° C.

2. A process as set forth in claim 1, wherein said solution of alpha-methyl styrene compound is of a concentration in the range 30%–90% by weight.

3. A process as set forth in claim 1, wherein said inert diluent is the isopropyl benzene compound from which said alpha-methyl styrene compound may be derived by dehydrogenation.

4. A process as set forth in claim 1 wherein the polymer produced is fractionally distilled.

5. A process which comprises polymerising alpha-methyl styrene by heating a solution thereof in isopropyl benzene, of a concentration in the range 30%–90% by weight, in the absence of a polymerisation catalyst, in the liquid phase, at a temperature in the range 290–350° C.

6. A process which comprises polymerising alpha-methyl para methyl styrene by heating a solution thereof in cymene, of a concentration in the range 30%–90% by weight, in the absence of a polymerisation catalyst, in the liquid phase, at a temperature in the range 290–350° C.

7. A process for the production of polymers of an alpha-methyl styrene compound selected from the group consisting of alpha-methyl styrene and its lower nuclear homologues which comprises dehydrogenating the corresponding isopropyl benzene compound to produce a mixture thereof with the alpha-methyl styrene compound, and effecting polymerisation by heating said mixture at a temperature in the range 290–350° C. in the liquid phase in the absence of a polymerisation catalyst.

8. A process as set forth in claim 7, wherein said mixture is concentrated if necessary to an alpha-methyl styrene compound content of 30%–90% by weight.

9. A process which comprises polymerising an alpha-methyl styrene compound selected from the group consisting of alpha-methyl styrene and its lower nuclear homologues by heating a solution thereof in an inert diluent, of a concentration not exceeding 90% by weight, in the absence of a polymerisation catalyst, in the liquid phase, at a temperature in the range 290–350° C., while passing said solution through an elongated tube.

10. A process as set forth in claim 9, wherein said solution of alpha-methyl styrene compound is of a concentration in the range 30%–90% by weight.

11. A process as set forth in claim 10 wherein said inert diluent is the isopropyl benzene compound from which said alpha-methyl styrene compound may be derived by dehydrogenation.

12. A process as set forth in claim 11 wherein said alpha-methyl styrene compound is alpha-methyl styrene and said inert diluent is isopropyl benzene.

HUGH CAMPBELL HIGHET.
FRANCIS EDWARD SALT.
HERBERT MUGGLETON STANLEY.

REFERENCES CITED

The following references are of record in the file of this patent:

UNITED STATES PATENTS

| Number | Name | Date |
| --- | --- | --- |
| 2,215,569 | Stanley et al. | Sept. 24, 1940 |
| 2,227,808 | Driesbach | Jan. 7, 1941 |
| 2,433,372 | Kress | Dec. 30, 1947 |
| 2,450,027 | Warner et al. | Sept. 28, 1948 |

OTHER REFERENCES

"Reactions of Pure Hydrocarbons," by Gustav Egloff; Reinhold Publishing Company, N. Y.; 1937; pages 585–590.